Sept. 28, 1965 A. PONS ET AL 3,209,009
DERIVATIVES OF CYCLOPROPYL-5-HYDANTOIN
Filed April 16, 1962 4 Sheets-Sheet 1
formula 1, formula 2
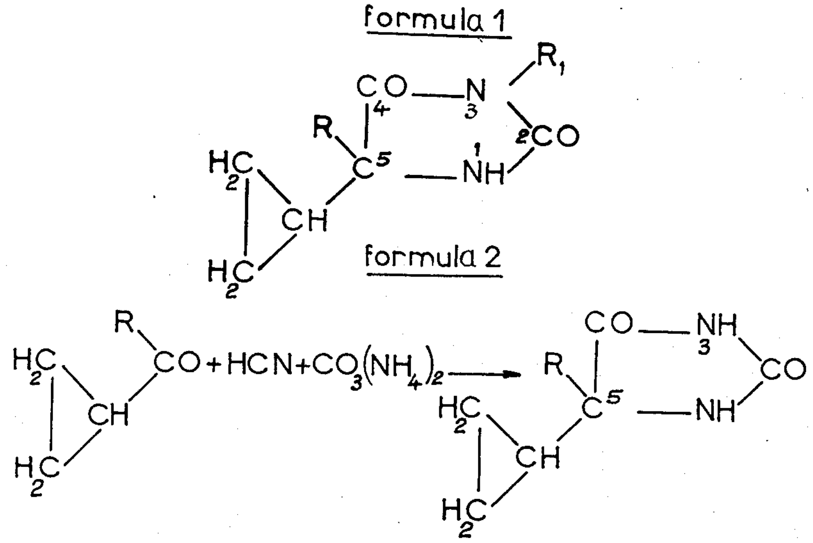
formula 3
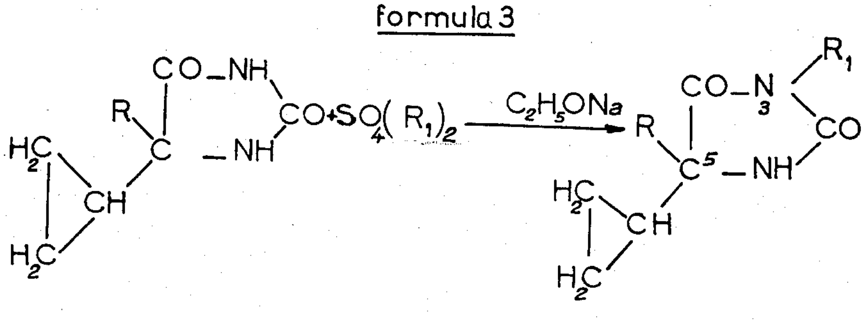
formula 4
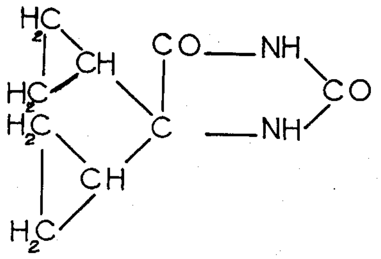
formula 5
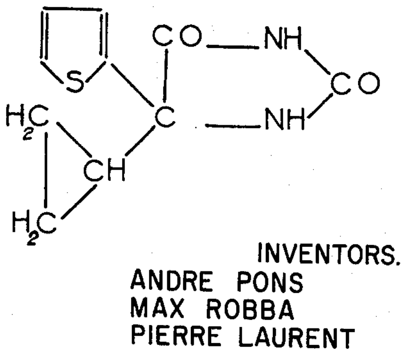
INVENTORS.
ANDRE PONS
MAX ROBBA
PIERRE LAURENT
BY Malcolm W. Fraser
ATTORNEY DERIVATIVES OF CYCLOPROPYL-5-HYDANTOIN
Filed April 16, 1962
formula 6
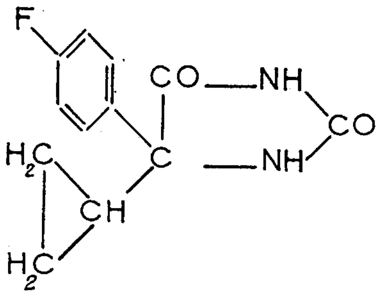
formula 7
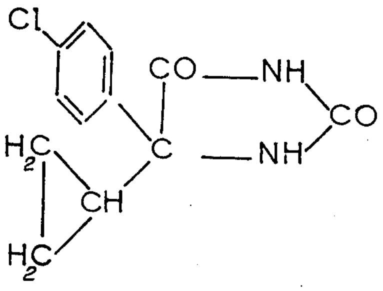
formula 8
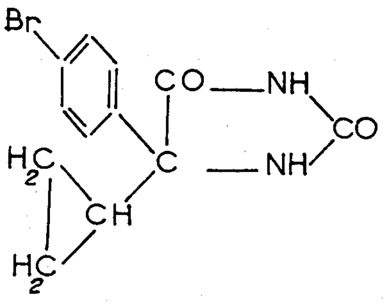
formula 9
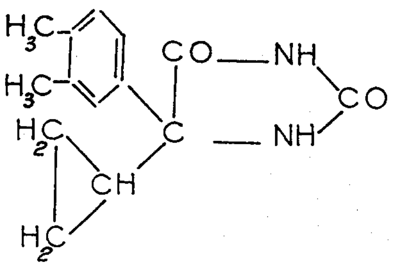
formula 10
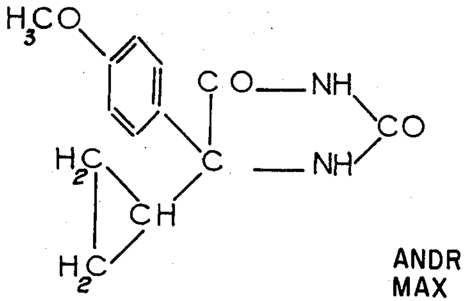
INVENTORS.
ANDRE PONS
MAX ROBBA
PIERRE LAURENT
BY Malcolm W. Fraser
ATTORNEY formula 11
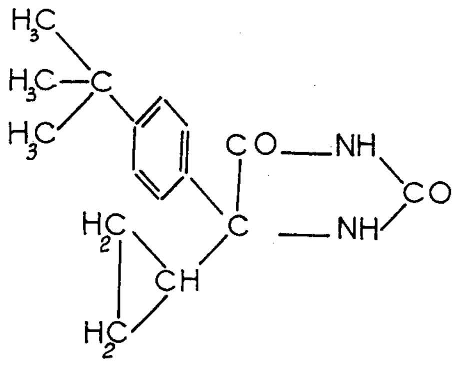
formula 12
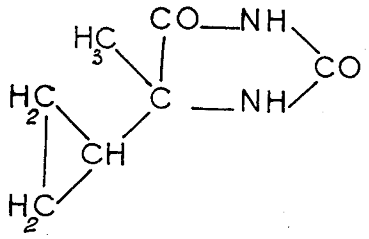
formula 13
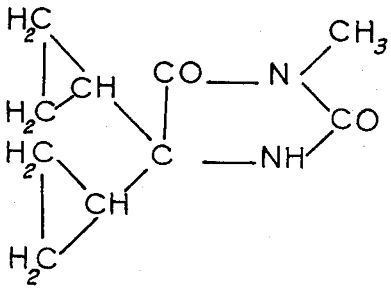
formula 14
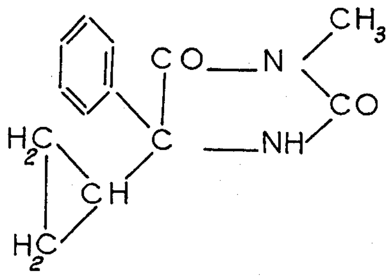
formula 15
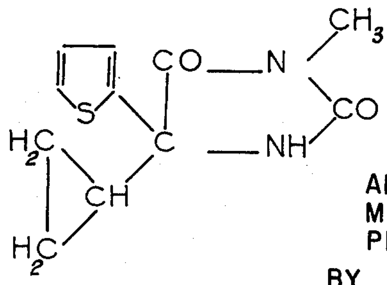
INVENTORS.
ANDRE PONS
MAX ROBBA
PIERRE LAURENT
BY Malcolm W. Fraser
ATTORNEY formula 16
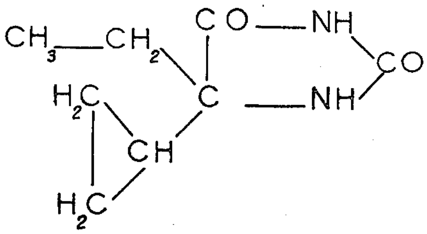
formula 17
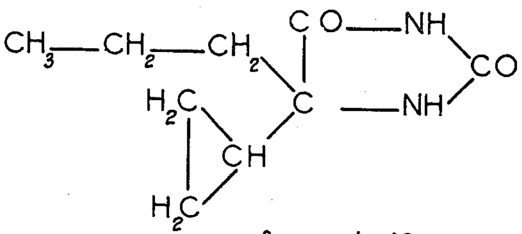
formula 18
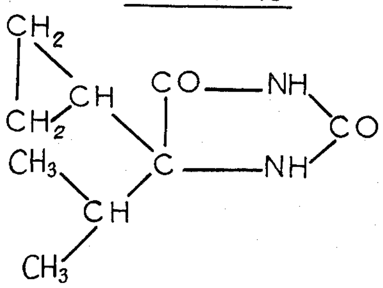
formula 19
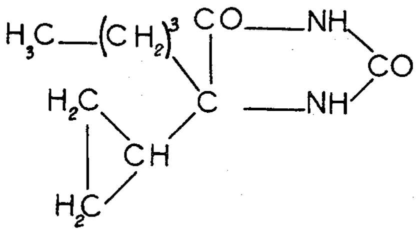
INVENTORS.
ANDRE PONS
MAX ROBBA
PIERRE LAURENT
BY Malcolm W. Fraser
ATTORNEY 3,209,009
DERIVATIVES OF CYCLOPROPYL-5-HYDANTOIN

André Pons and Max Robba, Paris, and Pierre Laurent, Saint-Ouen, France, assignors to Innothera, Couturier Arcueil (Seine), France, a company of France Filed Apr. 16, 1962, Ser. No. 187,678
Claims priority, application France, Apr. 20, 1961, 859,341
1 Claim. (Cl. 260—309.5)

The present invention has for its object by way of new drugs the derivatives of cyclopropyl-5-hydantoin which possess in addition to the cyclopropyl radical fixed on the carbon 5 another substituent fixed on the same carbon 5 and in certain cases a third substituent fixed on the nitrogen in position 3.

The compounds in accordance with the present invention correspond to the general Formula 1 in which R is an aliphatic radical having a number of carbon atoms varying between 1 and 12 or a mono-cyclo-aliphatic, mono-aromatic or mono-heterocyclic radical and $R_1$ represents hydrogen or an aliphatic radical having at least three carbon atoms.

The compounds in accordance with the present invention have antispasmodic and antiepileptic properties.

These compounds can be prepared in the following manner:

First of all the hydantoins which are disubstituted at 5 by the cyclopropyl radical and by the radical R are produced by employing as a starting material an alkyl-cycloalkyl- or aryl-cyclopropyl-ketone which is treated with hydrocyanic acid and ammonium carbonate in accordance with the reaction which is represented by Formula 2.

There are thus obtained hydantoins which are disubstituted at 5. The synthesis of hydantoins which are trisubstituted at —5, —5 and —3 is effected by making profitable use of the mobility of the hydrogen atom carried by the nitrogen in position —3. The said synthesis takes place in accordance with the reaction which is represented by Formula 3, starting from hydantoins which are disubstituted at —5 and prepared as indicated above, and which are treated with a dialkyl sulphate in an anhydrous alcohol medium and in the presence of sodium ethylate.

The hydantoins disubstituted at 5 are more especially obtained in the following manner:

A solution of 0.1 mol of alkyl-cycloalkyl- or aryl-cyclopropyl-ketone in 250 ml. of ethanol at 96° is mixed with a solution of 0.15 mol of potassium cyanide and 0.3 mol of ammonium carbonate in 250 ml. of water. The mixture is heated in the autoclave for a period of 18 hours at a temperature ranging from 110° to 120° C. After cooling, there is added to the solution 0.15 mol of potassium cyanide, 0.1 mol of ammonium carbonate and the heating treatment is continued for a period of 18 hours at the same temperature.

The cooled solution is concentrated at half-volume so as to eliminate the alcohol and is carefully acidified with hydrochloric acid.

Two cases can then arise:

(1) If the hydantoin precipitates in the solid form, it is merely necessary to hydro-extract, wash, dry and recrystallize it in an appropriate solvent such as ether, benzene, chloroform or ethanol.

(2) If the hydantoin separates out in oily form, it is extracted either with ether or with chloroform; the organic phase is exhausted by a 5% solution of sodium hydroxide. This alkaline and acidified solution permits the precipitation of the hydantoin disubstituted at 5 which is recrystallized in an appropriate solvent. The evaporation of the ethereal phase after exhaustion by the sodium hydroxide makes it possible to recover the starting material which may not have reacted.

When it is desired to accomplish the synthesis of hydantoins which are trisubstituted at —5, —5 and —3, there is employed the general process which is described below:

To a solution of 0.1 mol of sodium in 450 ml. of absolute ethanol there is added 0.1 mol of a hydantoin disubstituted at 5, then 0.1 mol of di-alkyl sulphate and the mixture is reflux heated until it becomes acid.

The alcohol is completely evaporated by heating in a vacuum; the residue receives an addition of a few ml. of water and is dissolved in ether.

The ethereal solution is extracted with a 5% solution of sodium carbonate until the acidification of the extraction solution no longer produces a precipitate; the product obtained in this manner is constituted by starting material, namely hydantoin disubstituted at 5.

The ethereal phase which is dried on sodium sulphate and evaporated produces crude hydantoin trisubstituted at —5, —5 and —3 which is purified by recrystallization in a suitable solvent (ether, benzene, chloroform or ethanol).

CHARACTERISTICS

The hydantoin disubstituted at 5 and the hydantoins trisubstituted at 5 and 3 are solid and crystallized compounds which are very stable and have a well-defined melting point. They are very little soluble in water but are soluble in alkaline solutions, while the hydantoins disubstituted at 5 are soluble in the alkaline carbonates and hydroxides, and the hydantoins trisubstituted at 5 and 3 are not soluble in the alkaline carbonates but are soluble in the alkaline hydroxides.

The hydantoins in accordance with the present invention are soluble in the usual organic solvents, especially in ether, benzene, chloroform, methanol and ethanol.

The following examples, which are not given by way of limitation, indicate the method of preparation of a few hydantoins disubstituted at 5 and a few hydantoins trisubstituted at 3 and 5.

*Example 1*

Dicyclopropyl —5, —5 hydantoin
Empirical formula: $C_9H_2N_2O_2$
Molecular weight: 180.20

This compound corresponds to Formula 4.

The preparation of the said compound is effected as follows:

A solution of 5 grams of dicyclopropyl-ketone in 100 ml. of ethanol receives an addition of a solution of 4.5 grams of potassium cyanide and 13 grams of ammonium carbonate ($CO_3NH_4$, $1H_2O$) and the mixture is heated to 110° C. in the autoclave for a period of 18 hours. There is added 4.5 grams of potassium cyanide, 4.4 grams of ammonium carbonate and heating is effected for a further period of 18 hours at 110° C. The solution is concentrated to one half-volume, acidified with hydrochloric acid and the white precipitate obtained is hydro-extracted, washed with cold water, dried and purified by recrystallisation in ethanol.

White crystals F:199°—Rt.:73%

*Example 2*

Cyclopropyl -5-(thienyl-2')-5-hydantoin
Empirical formula: $C_{10}H_{10}N_2O_2S$
Molecular weight: 22.262

This compound corresponds to Formula 5.

Cyclopropyl-5-(thienyl - 2') - 5 - hydantoin is prepared from 10 grams of cyclopropyl-(thienyl-2')-ketone in accordance with the method of operation described in Example 1. The hydantoin is purified by recrystallization in the chloroform-ethanol mixture.

White crystals F:200°, 201°—Rt:50%

*Example 3*

Cyclopropyl-5-(fluoro-4'-phenyl)-5-hydantoin
Empirical formula: $C_{12}H_{11}FN_2O_2$
Molecular weight: 234.224

This compound corresponds to Formula 6.

The said compound is prepared from 4.62 grams of cyclopropyl (fluoro-4'-phenyl)-5 ketone, in accordance with the method of operation described in Example 1.

Purification by recrytsallization in ethanol.

White crystals F:232°—Rt:63%

*Example 4*

Cyclopropyl-5-(chloro-4'-phenyl)-5-hydantoin
Empirical formula: $C_{12}H_{11}ClN_2O_2$
Molecular weight: 250.681

This compound corresponds to Formula 7.

The said compound is prepared from 5 grams of cyclopropyl-chloro-4'-phenyl-ketone in accordance with the method of operation described in Example 1.

Purification by recrystallization in ethanol.

White crystals F:252°—Rt:58%

*Example 5*

Cyclopropyl-5-(bromo-4'-phenyl)-5-hydantoin
Empirical formula: $C_{12}H_{11}BrN_2O_2$
Molecular weight: 295.14

This compound corresponds to Formula 8.

The said compound is prepared from 5 grams of cyclopropyl-bromo-4'-phenyl-ketone, in accordance with the method of operation described in Example 1. Purification by recrystallization in ethanol.

White crystals F:243°—Rt:81%

*Example 6*

Cyclopropyl-5-(dimethyl-3',4'-phenyl)-5-hydantoin
Empirical formula: $C_{14}H_{16}N_2O_2$
Molecular weight: 244.28

This compound corresponds to Formula 9; it is prepared from 5 grams of cyclopropyl-5-dimethyl-3',4'-phenyl-5-ketone, in accordance with the method of operation described in Example 1. Purification by recrystallization in ethanol.

White crystals F:199°—Rt:75%

*Example 7*

Cyclopropyl-5-(methoxy-4'-phenyl)-5-hydantoin
Empirical formula: $C_{13}H_{14}N_2O_3$
Molecular weight: 246.26

This compound, which corresponds to Formula 10, is prepared from 5 grams of cyclopropyl-methoxy-4'-phenyl-5-ketone, in accordance with the method of operation described in Example 1. Purification by recrystallization in ethanol.

White crystals F:236°—Rt:84%

*Example 8*

Cyclopropyl-5-tert butyl-4'-phenyl-5-hydantoin
Empirical formula: $C_{16}H_2ON_2O_2$
Molecular weight: 272.34

This compound corresponds to Formula 11; it is prepared from 6 grams of cyclopropyl-tert butyl-4'-phenyl-ketone, in accordance with the method of operation described in Example 1. Purification by recrystallization in ethanol.

White crystals F:250°-251°—Rt:40%

*Example 9*

Cyclopropyl-5-methyl-5-hydantoin
Empirical formula: $C_7H_{10}N_2O_2$
Molecular weight: 154.17

This compound, which corresponds to Formula 12, can be prepared starting from 10 grams of cyclopropyl-methyl-ketone, in accordance with the method of operation described in Example 1.

White crystals F:146°

*Example 10*

Methyl-3 dicyclopropyl-5, 5-hydantoin
Empirical formula: $C_{10}H_{14}N_2O_2$
Molecular weight: 194.23

This compound corresponds to Formula 13; it is prepared in the following manner:

To a solution of 0.36 gram of sodium in 80 ml. of absolute ethanol, there is added 2.75 grams of dicyclopropyl-5,5-hydantoin, 1.96 gram of methyl sulphate and reflux heat treatment is then carried out for a period of 14 hours. The solvent is eliminated, the residue receives an addition of 2 ml. of water and is dissolved in 100 ml. of ether. The ethereal phase is exhausted a number of times by a 5% solution of sodium carbonate, then dried on anhydrous sodium sulphate and the solvent is eliminated. The hydantoin thus obtained is recrystallized in the ethanol and ether which is mixed in equal parts.

White crystals F:136°—Rt:81%

*Example 11*

Methyl-3 cyclopropyl-5-phenyl-5-hydantoin
Empirical formula: $C_{13}H_{14}N_2O_2$
Molecular weight: 230.26

This compound corresponds to Formula 14.

The preparation of the said compound is carried out with 2.52 grams of cyclopropyl-5-phenyl-5-hydantoin as a starting material, in accordance with the method of operation described in Example 10. Purification by recrystallization in the ether-ethanol mixture.

White crystals F:117.5°—Rt:85%

*Example 12*

Methyl-3 cyclopropyl-5-thienyl-2'-5-hydantoin
Empirical formula: $C_{11}H_{12}N_2O_2S$
Molecular weight: 236.22

This compound, which corresponds to Formula 15, is prepared by employing as a starting material 3.48 grams of cyclopropyl-5-thienyl-2'-5-hydantoin and by carrying out a reflux heat treatment for a period of 25 hours and in accordance with the method of operation described in Example 10.

Purification by recrystallization in ethyl ether.

White crystals F:123°-124°—Rt:90%

*Example 13*

Cyclopropyl-5 ethyl-5 hydantoin
Empirical formula: $C_8H_{12}N_2O_2$
Molecular weight: 168.19

This compound, which corresponds to Formula 16, can be prepared from 10 grams of cyclopropyl-ethyl-ketone as a starting material, in accordance with the method of operation described in Example 1.

White crystals F:156°—Rt:90%

*Example 14*

Cyclopropyl-5 n-propyl-5 hydantoin
Empirical formula: $C_9H_{14}N_2O_2$
Molecular weight: 182.22

This compound, which corresponds to Formula 17, can be prepared from 10 grams of cyclopropyl-n-propyl-ketone as a starting material, in accordance with the method of operation described in Example 1.

White crystals F: 163°—Rt: 95%

*Example 15*

Cyclopropyl-5 isopropyl-5 hydantoin
Empirical formula: $C_9H_{14}N_2O_2$
Molecular weight: 182.22

This compound, which corresponds to Formula 18, can be prepared from 10 grams of cyclopropyl isopropyl-ketone, in accordance with the method of operation described in Example 1.

White crystals F: 193°—Rt: 70%

*Example 16*

Cyclopropyl-5 n-butyl-5 hydantoin
Empirical formula: $C_{10}H_{16}N_2O_2$
Molecular weight: 196.24

This compound, which corresponds to Formula 19, can be prepared from 10 grams of cyclopropyl n-butyl-ketone, in accordance with the method of operation described in Example 1.

White crystals F: 152°—Rt: 75%

The pharmacologic proportions of the disubstituted and trisubstituted hydantoins in accordance with the invention can be appreciated from the tests indicated below:

(I) ACUTE TOXICITY

The hydantoins subjected to test are placed in suspension in a 4% acacia syrup and are administered per-orally by means of an oesophageal probe to batches of female mice having an average weight of twenty grams ± one gram.

Dead animals are counted in the course of the twenty-four hours which follow ingestion.

The 50% lethal dose (DL 50) is calculated in accordance with the approximation method by establishing experimentally the regression line of the approximation percentages as a function of the logarithm of the dose administered.

The results obtained are as follows:

| Compounds | DL 50±DL 50 in mg./kg. |
|---|---|
| Methyl-3 cyclopropyl-5-thienyl-2′-5-hydantoin | 1,000±200 |
| Cyclopropyl-5-fluoro-4′-phenyl-5-hydantoin | 1,000±294 |
| Cyclopropyl-5-thienyl-2′-5-hydantoin | 1,000±188 |
| Methyl-3 cyclopropyl-5-phenyl-5-hydantoin | (1) |
| Methyl-3 dicyclopropyl-5,5-hydantoin | 1,000±357 |
| Dicyclopropyl-5,5-hydantoin | 1,200±71.6 |
| Cyclopropyl-5-methoxy-4′-phenyl-5-hydantoin | 1,700±178 |
| Cyclopropyl-5-bromo-4′-phenyl-5-hydantoin | >2,000 |
| Cyclopropyl-5-phenyl-5-hydantoin | >2,000 |
| Cyclopropyl-5-ethyl-5-hydantoin | >2,000 |
| Cyclopropyl-5-n-propyl-5-hydantoin | 1,900 |
| Cyclopropyl-5-isopropyl-5-hydantoin | >3,000 |
| Cyclopropyl-5-n-butyl-5-hydantoin | 1,200 |

[1] A little below 1,000.

(II) DETERMINATION OF NEUROTOXICITY

Neurotoxicity becomes apparent in mice in a usually objective manner and a different manner depending on the categories of substances: in the form of somnolence, ebrious behaviour, agitation. At higher doses, major disorders appear such as convulsions and paralysis.

In the present study, a test found to be acceptable as an indication of neurotoxicity is the manifestation of ebrious behaviour within three hours of administering the product orally.

The substances studied have been administered in three doses: 100, 200 and 300 mg./kg. An acknowledged neurotoxic dose is a dose which produces ebrious behaviour in at least 50% of the cases treated.

The results obtained are shown in the following table:

| Compounds | 50% neurotoxic doses in mg./kg. |
|---|---|
| Dicyclopropyl-5,5-hydantoin | <100 |
| Methyl-3-cyclopropyl-5-phenyl-5-hydantoin | <100 |
| Cyclopropyl-5-phenyl-5-hydantoin | <100 |
| Cyclopropyl-5-fluoro-4′-phenyl-5-hydantoin | 100 |
| Methyl-3-cyclopropyl-5-thienyl-2′-5-hydantoin | 200 |
| Cyclopropyl-5-thienyl-2′-5-hydantoin | 200 |
| Methyl-3-dicyclopropyl-5,5-hydantoin | 300 |
| Cyclopropyl-5-bromo-4′-phenyl-5-hydantoin | >300 |
| Methyl-3-cyclopropyl-5-phenyl-5-hydantoin | >300 |
| Cyclopropyl-5-ethyl-5-hydantoin | |
| Cyclopropyl-5-n-propyl-5-hydantoin | 300 |
| Cyclopropyl-5-isopropyl-5-hydantoin | 200 |
| Cyclopropyl-5-n-butyl-5-hydantoin | 200 |

(III) EXTENT OF PROTECTION AGAINST STRYCHNINE

Strychnine in an appropriate dose gives rise in animals to convulsive fits which can be inhibited by means of certain pharmacologic substances. Tests are effected as follows:

1 mg. of strychnine is administered to female mice per kilogram weight of the animal by intravenous injection. The strychnine is dissolved in physiological serum (0.9% sodium chloride), the quantities injected 0.5 cc. for 20 grams by weight of body, while the rate of injection is constant and equal to 20″ per cc. ±1″.

The substance which is submitted to study is administered per-orally thirty minutes prior to the injection of strychnine. Since the intravenously-injected dose of 1 mg. of strychnine per kilogram of body weight is always fatal in the case of mice, the animals killed within one half hour after the injection of strychnine are counted as a function of the dose administered. The linear regression between the calcuation of the motality percentage and the logarithm of the dose administered provides the efficient dose in 50% of the cases treated (DE 50). The results obtained are summarized in the following table:

| Compounds | Effective 50% dose and its standard deviation in mg./kg. |
|---|---|
| Methyl-3-cyclopropyl-5-phenyl-5-hydantoin | 80±15 |
| Methyl-3-cyclopropyl-5-thienyl-2′-5-hydantoin | 105±27 |
| Cyclopropyl-5-thienyl-2′-5-hydantoin | 175±47 |
| Dicyclopropyl-5,5-hydantoin | 250±65 |
| Cyclopropyl-5-phenyl-5-hydantoin | 325±50 |
| Cyclopropyl-5-fluoro-4′-phenyl-5-hydantoin | 700±200 |
| Cyclopropyl-5-bromo-4′-phenyl-5-hydantoin | (1) |
| Methyl-3-dicyclopropyl-5,5-hydantoin | (1) |
| Cyclopropyl-5-methoxy-4′-phenyl-5-hydantoin | (1) |
| Cyclopropyl-5-ethyl-5-hydantoin | >300 |
| Cyclopropyl-5-n-propyl-5-hydantoin | 250 |
| Cyclopropyl-5-isopropyl-5-hydantoin | >300 |
| Cyclopropyl-5-n-butyl-5-hydantoin | 285 |

[1] No protection at 600.

(IV) PROTECTION AGAINST CARDIAZOL

In the same way as strychnine, cardiazol produces conclusive fits which can be inhibited by certain substances.

The anti-cardiazol protective activity is determined by a method of effective doses. A dose of 85 mg./kg. is administered to batches of female mice by intraperitoneal injection (volume of the injection=0.1 cc., instantaneous rate). Such a dose results in cardiazolic fits in 100% of the cases treated and a 70% fatality rate. The cardiazolic fits are characterized by squeaking, rearing of the animal on its hind legs, convlusions, tonic spasms with extension of the rear paws which is generally followed by death. The animals receive the products studied always orally, the dose administered being 100 mg./kg. one hour prior to injection of cardiazol. Those subjects treated which develop fits must be isolated in order to prevent them from inducing fits in their neighbors. Those animals which have not contracted fits within one half hour from the time of the injection are then counted.

This test has given the results recorded hereunder:

| Compounds | Percentage of animals protected by 100 mg./kg. of product administered per-orally |
|---|---|
| Cyclopropyl-5-thienyl-2′-5-hydantoin | 100 |
| Methyl-3-cyclopropyl-5-phenyl-5-hydantoin | 100 |
| Cyclopropyl-5-phenyl-5-hydantoin | 90 |
| Methyl-3-dicyclopropyl-5,5-hydantoin | 70 |
| Dicyclopropyl-5,5-hydantoin | 50 |
| Cyclopropyl-5-fluoro-4′-phenyl-5-hydantoin | 50 |
| Methyl-3-cyclopropyl-5-thienyl-2′-5-hydantoin | 20 |
| Cyclopropyl-5-bromo-4′-phenyl-5-hydantoin | 10 |
| Cyclopropyl-5-methoxy-4′-phenyl-5-hydantoin | 0 |
| Cyclopropyl-5-ethyl-5-hydantoin | 20 |
| Cyclopropyl-5-n-propyl-5-hydantoin | 10 |
| Cyclopropyl-5-isopropyl-5-hydantoin | 0 |
| Cyclopropyl-5-n-butyl-5-hydantoin | 90 |

(V) EXTENT OF PROTECTION AGAINST THE MAXIMUM ATTACK OF ELECTRIC SHOCK

Electric shocks produce under certain conditions the appearance of a tonic component of the convlusive fit. This component is characterized by the extension of the rear paws.

Electrodes for corneal stimulation and bathing of the eye with physiological serum in a proportion of 9 grams per liter. Square shock-sequence: duration 200 ms. 50 c./s., width 10 ms. Constant-voltage output.

(1) The threshold voltage at which the appearance of the tonic component occurs is determined.

(2) The products studied are administered orally in doses of 100, 50 and 25 mg./kg. according to the activity of the product.

(3) One hour afterwards, the threshold voltage is re-applied; the ratio between the threshold value (A) prior to administration of the protective product and the threshold value (B) after administration is then calculated. It is considered that the protection is significant when $A/B$ is $\leqslant$ with respect to 0.5; in other words, when the new threshold is at least double the original threshold.

The results obtained are summarized in the following table:

| Compounds | Percentage of animals protected in accordance with the dose in mg./kg. | | | |
|---|---|---|---|---|
| | 100 | 50 | 25 | 12.5 |
| Methyl-3-cyclopropyl-5-phenyl-5-hydantoin | 100 | 100 | 90 | — |
| Cyclopropyl-5-phenyl-5-hydantoin | 100 | 100 | 90 | — |
| Cyclopropyl-5-thienyl-2′-5-hydantoin | 100 | 100 | 70 | 0 |
| Methyl-3-cyclopropyl-5-thienyl-2′-5-hydantoin | 100 | — | — | — |
| Dicyclopropyl-5,5-hydantoin | 80 | — | — | — |
| Cyclopropyl-5-bromo-4′-phenyl-5-hydantoin | 50 | — | — | — |
| Methyl-3-dicyclopropyl-5,5-hydantoin | 40 | — | — | — |
| Cyclopropyl-5-fluoro-4′-phenyl-5-hydantoin | 28 | — | — | — |
| Cyclopropyl-5-methoxy-4′-phenyl-5-hydantoin | 0 | — | — | — |
| Cyclopropyl-5-ethyl-5-hydantoin | — | — | — | — |
| Cyclopropyl-5-n-propyl-5-hydantoin | 30 | 0 | — | — |
| Cyclopropyl-5-isopropyl-5-hydantoin | 60 | 0 | — | — |
| Cyclopropyl-5-n-butyl-5-hydantoin | 30 | 0 | — | — |

(—) Doses not tested.

(VI) DETERMINATION OF THE PROTECTION IN THE CASE OF AN INCREASE BY 50% OF THE THRESHOLD OF MINIMUM ATTACK OF ELECTRIC SHOCK

The operation is carried out in the following manner:

The type of attack which is sought in this case entails all the minor disorders which result from an electric shock. The minimum attack begins with a trembling of the jaw followed by a phase of hebetude (animal in the motionless state), then by the appearance in a large number of cases of a hyperactivity phase with running and jumping.

The most characteristic phase in this case is the hebetude phase: and it is this phase which serves as a basis for determining the presence or absence of attack.

The characteristics of stimulation are identical to those of the maximum attack but in this case, there is employed a "constant current" output.

The threshold of attack is pre-determined in the case of each animal several days before carrying out the experiment; when this threshold remains unvarying for two days running, the product to be tested is administered orally on the third day to batches of female mice, the dose administered being 100 mg./kg. One hour afterwards, the animal is subjected to an electric shock having a current intensity which is 50% higher than that of the threshold shock previously fixed. If this shock is ineffective, the animal is considered to be protected.

These results are summarized in the table given hereunder:

| Compounds | Percentage of animals protected in the case of an increase of the threshold shock value by 50% (dose of 100 mg./kg.) |
|---|---|
| Cyclopropyl-5-thienyl-2′-5 hydantoin | 100 |
| Methyl-3-cyclopropyl-5-phenyl-5-hydantoin | 100 |
| Cyclopropyl-5-phenyl-5-hydantoin | 100 |
| Methyl-3-dicyclopropyl-5,5-hydantoin | 24 |
| Methyl-3-cyclopropyl-5-thienyl-2′-5-hydantoin | 14 |
| Dicyclopropyl-5,5-hydantoin | 12 |
| Cyclopropyl-5-bromo-4′-phenyl-5-hydantoin | 12 |
| Cyclopropyl-5-fluoro-4′-phenyl-5-hydantoin | 12 |
| Cyclopropyl-5-methoxy-4′-phenyl-5-hydantoin | 0 |

What we claim is:

Dicyclopropyl—5,5-hydantoin.

References Cited by the Examiner

UNITED STATES PATENTS 2,366,221 1/45 Spurlock ____________ 260—309.5
2,696,372 1/61 Braun et al. __________ 260—310

FOREIGN PATENTS 611,057 3/35 Germany.
1,020,632 12/57 Germany.
430,282 6/35 Great Britain.
752,692 7/56 Great Britain.

OTHER REFERENCES

Connors et al.: Jour. Chem. Soc. (London), pp. 2119–32 (1960).

German application 1,041,502, printed October 23, 1958 (Kl 12 p. 9), 1 page spec.

Henze et al.: Jour. Amer. Chem. Soc., vol. 74, pp. 3615–7 (1952).

Robba et al.: Bull. Soc. Chim., France, 1961, pp. 2161–65.

WALTER A. MODANCE, *Primary Examiner.*

IRVING MARCUS, NICHOLAS S. RIZZO, *Examiners.*